Sept. 4, 1923. 1,466,742
J. F. O'CONNOR
FRICTION SHOCK ABSORBING MECHANISM
Filed Oct. 17, 1921 2 Sheets-Sheet 1
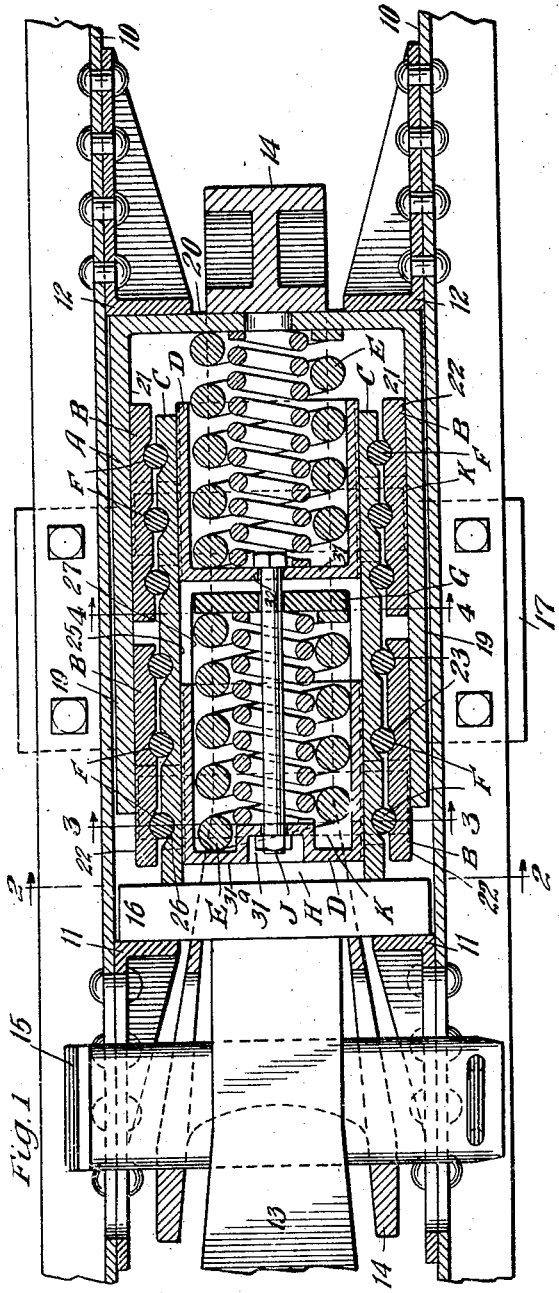
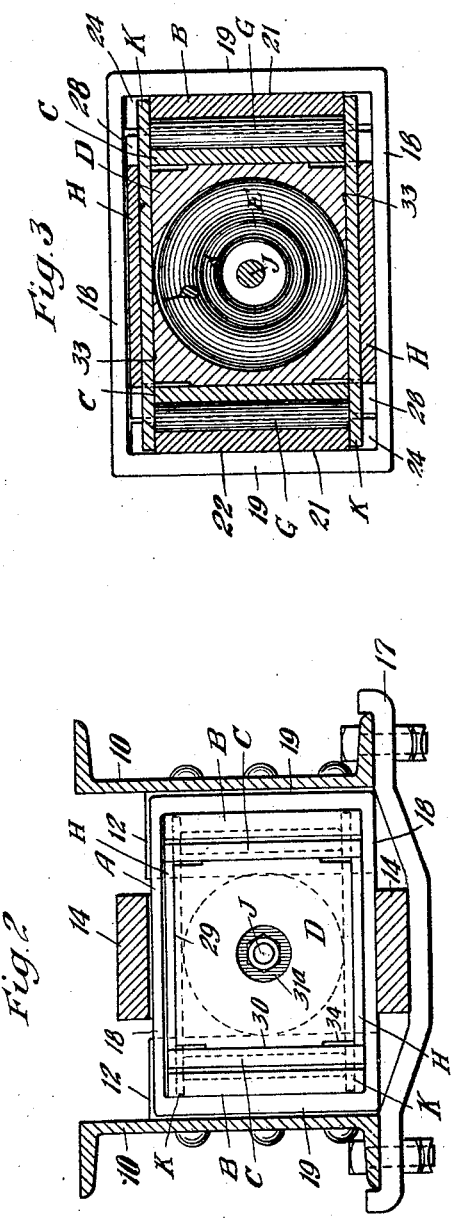
Witnesses
Wm. Geiger
Inventor
John F. O'Connor
By Geo. I. Haight
His Atty.

Sept. 4, 1923. 1,466,742
J. F. O'CONNOR
FRICTION SHOCK ABSORBING MECHANISM
Filed Oct. 17, 1921 2 Sheets-Sheet 2
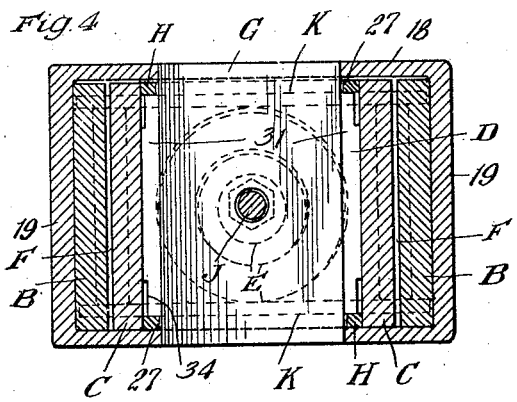
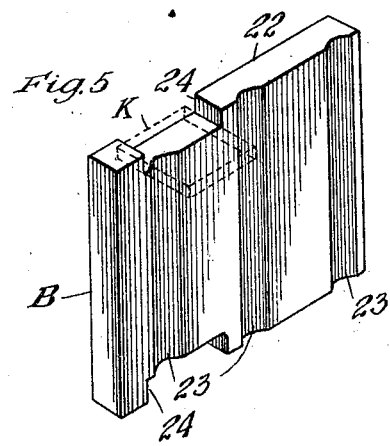
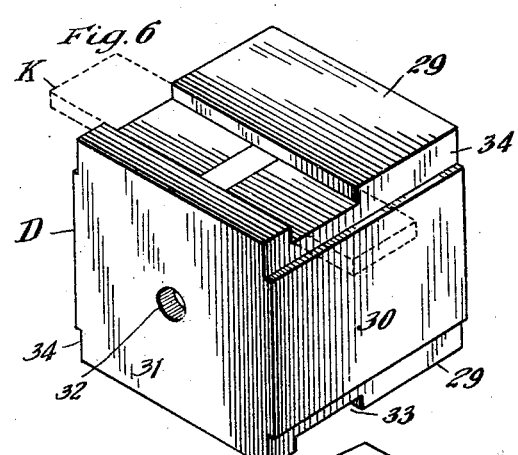
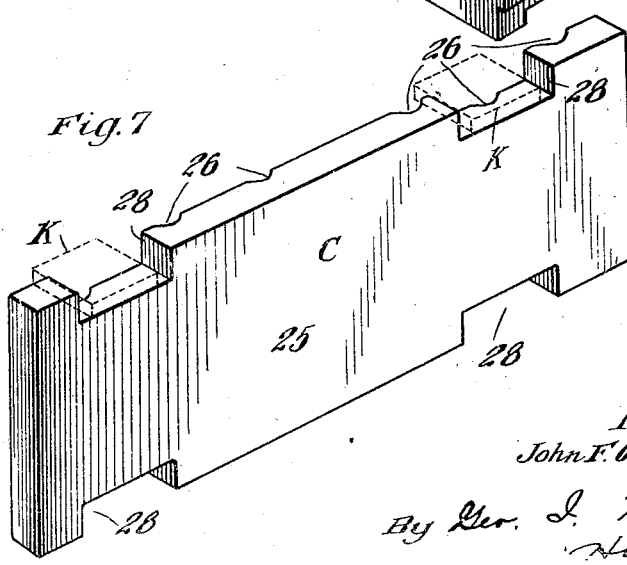
Witnesses
Wm. Geiger
Inventor
John F. O'Connor
By Geo. I. Haight
His Atty.

Patented Sept. 4, 1923.

1,466,742

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 17, 1921. Serial No. 508,339.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein are obtained high-capacity, large area of friction surfaces and a compact arrangement.

More specifically, the object of my invention is to provide an arrangement of the character indicated in the preceding paragraph wherein the spring resistance is disposed within or between the friction-shoes and wedges to the end that the length of the friction-shoes may be increased and, in fact, made substantially commensurate with the length of the spring resistance.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. Figs. 3 and 4 are enlarged transverse vertical sectional views of the shock absorbing mechanism proper corresponding to the section lines 3—3 and 4—4, respectively, of Fig. 1. And Figs. 5, 6, and 7 are detail perspectives of one of the friction-shoes, one of the spring cage followers, and one of the wedge elements, respectively.

In said drawings, 10—10 denote channel draft sills of a railway car to the inner faces of which are secured front stop lugs 11—11 and rear stop lugs 12—12. A portion of a drawbar is indicated at 13, the same being operatively associated with the shock absorbing mechanism proper by a hooded cast yoke 14 and coupler key 15. The shock absorbing mechanism proper, the front follower 16 and the yoke are supported in operative position by a detachable saddle plate 17.

The improved shock absorbing mechanism proper, as shown, comprises, broadly, a friction shell A; a plurality of friction-shoes B—B; a pair of wedge elements C—C; a pair of combined spring followers and cages D—D; tandem arranged springs E—E; anti-friction rollers F—F interposed between the wedge elements and the friction-shoes; a retainer key G; plates H—H between the wedge elements; a retainer bolt J; and keys K—K.

The shell A is preferably in the form of a casting of rectangular hollow box-like form having top and bottom horizontal walls 18—18, side walls 19—19 and back follower acting wall 20. The side walls 19 provide longitudinally extending friction surfaces 21—21 on the inner side thereof.

The friction-shoes B are four in number arranged in opposed pairs and with the pairs in tandem formation. Each shoe B is formed on the outer side with a flat friction surface 22 cooperable with a corresponding shell friction surface 21. On its inner side, each shoe B is formed with a plurality of, preferably three, inclined wedge-roller-seats 23—23 spaced uniformly lengthwise of the shoe. The shoes B are furthermore recessed on their top and bottom edges as indicated at 24—24 in Fig. 5 to accommodate the laterally extended ends of the keys K, as indicated by dotted outlines of the keys in Fig. 5. In this connection, it will be noted that the length of the recesses 24 is slightly in excess of the width of the keys K so as to compensate for wear as the shoes gradually work outwardly of the shell. In normal position of the parts, that is, in full release, the keys K engage the outermost shoulders defined by the recesses 24, as indicated in Fig. 1. As heretofore described, the shoes B are of like construction except that there is a slight difference in the location of the recesses 24 as between the front and rear pairs, the recesses in the rear pair of shoes B being located somewhat nearer the middle than in the case of the front pair.

The two wedge elements C are of like construction and each is in the form of an elongated member having a flat face 25 on the inner side and a series of wedge roller seats 26—26 on the outer side facing the shoes. When three wedge roller seats 23 are used on each shoe B, there will be six corresponding wedge-roller-seats 26 on each element C. The outer ends of the wedge elements C project forwardly or outwardly beyond the ends of the outer pair of shoes B and are in engagement with the front follower 16. To prevent the wedge elements C from moving inwardly toward each other and to maintain them always in the proper spaced relation, the two plates H are employed, one at the top and the other at the bottom of the shell A, as shown best in Fig. 3. Said plates H act as spacers for the wedge-elements C, as will be understood and are adapted to shift lengthwise within the shell A. Said plates H are recessed near their central portions, as indicated at 27 in Fig. 4 where the same pass by the retainer plate G. The upper edges of the wedge elements C are recessed or cut away as indicated at 28—28 to freely accommodate the keys K, the lengths of said recesses 28 being greater than the width of the keys and preventing the wedge elements C from ever coming into shouldered engagement with said keys. From the preceding description, it will be seen that the two wedge elements C, together with the plates H form what may be termed a hollow-wedge-system and within which are contained the springs E in cages D.

The springs E, as shown, are of the usual coil form each consisting of an outer heavy coil and an inner lighter coil. The springs E are arranged in tandem formation, the innermost spring bearing at its rear end against the wall 20 of the shell A and the forward spring E bearing at its rear end against the stationary retainer or abutment key or plate G, the latter being inserted vertically thru suitable openings in the top and bottom walls of the shell A and held against longitudinal movement with respect to the shell.

The combined spring followers and cages D are of substantially like construction, each having top and bottom parallel walls 29—29, side walls 30—30 and front walls 31. The front walls 31 provide bearings for the forward ends of the springs E as clearly shown in Fig. 1. The interiors of the members D are preferably made cylindrical as best indicated in Fig. 3 to thereby center the springs E. The front walls 31 of the members D are apertured as indicated at 32 to accommodate the retainer bolt J and, in the case of the front member D, the wall is countersunk as indicated at 31ª to provide a pocket for the accommodation of the nut of the retainer bolt J. Said retainer bolt J passes through a suitable opening in the stationary plate or key G and it will also be noted that the bolt J serves to maintain the plate G in proper vertical position.

The top and bottom walls 29 of the members D are grooved or recessed as indicated at 33—33 to receive the cross keys K. The width of the recesses 33 corresponds to the width of the keys K so that relative movement between the keys K and the members D in a direction lengthwise of the shell A is prevented. The sides of the members D are partially cut away at the top and bottom as indicated at 34 so as to reduce the area of contact between the sides of said members D and the wedge elements C while at the same time leaving a support for the central portions of the wedge elements C, to avoid their buckling, as will be apparent from an inspection of Fig. 3.

The operation of the mechanism is as follows, assuming an inward or buffing movement of the drawbar. As the drawbar moves inwardly thereby moving the follower 16 therewith, the pressure is applied to the wedge elements C. The latter act substantially in the manner of a solid, centrally disposed wedge and immediately produce lateral pressure on the shoes B because of the wedge roller seats 26 and 23 and the rollers F. The shoes B are thereby caused to travel inwardly of the shell but are under the resistance of the springs E, inasmuch as the inward movement of the shoes B causes a corresponding inward or longitudinal movement of the upper and lower sets of keys K which in turn causes a similar movement of the spring cage followers D. In this manner the resistance of the springs E is transferred directly to the shoes B. In release, on account of the anti-friction rollers between the shoes B and the wedge elements C, the latter substantially instantaneously move outwardly slightly with respect to the shoes, thereby reducing the spreading or wedging action and allowing the springs to expand and force all of the parts outwardly in a manner similar to the action of the well-known "Miner" gear.

By arranging the parts as shown and described, I am enabled to employ two springs in tandem arrangement and also to employ friction-shoes, the effective length of each of which is substantially the same as the free height of each spring. Stated in another manner, I am enabled to employ substantially the entire length of the friction shell surfaces for active work, thus obtaining greater friction wearing areas than heretofore in a mechanism employing a wedge system between the shoes and all of which elements are movable lengthwise of the shell.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having interior friction surfaces; of oppositely disposed wedge-friction-shoes cooperable with said shell friction surfaces; wedge elements cooperable with said wedge-friction-shoes; a spring within said shell, located between and in spaced relation to said shoes; and means for transferring resistance of the spring to the shoes.

2. In a friction shock absorbing mechanism, the combination with a friction shell having longitudinally extending interior friction surfaces; of wedge-friction-shoes cooperable with the shell friction surfaces and movable longitudinally thereof; wedge elements cooperable with said shoes and movable longitudinally of the shell; a plurality of springs compressible in a direction lengthwise of the shell and located between the shoes; and means for transferring the resistance of all of said springs to the shoes.

3. In a friction shock absorbing mechanism, the combination with a friction shell having interior friction surfaces; of oppositely disposed wedge-friction-shoes cooperable with the shell friction surfaces; a hollow wedge system cooperable with said shoes; a spring within said hollow wedge system; and means for transferring the resistance of the spring to the shoes.

4. In a friction shock absorbing mechanism, the combination with a friction shell having interior longitudinally arranged friction surfaces; of tandem arranged sets of friction-shoes cooperable with the shell friction surfaces; wedge elements cooperable with said shoes and disposed on the inner side thereof; tandem arranged springs within the shell and located between the shoes; and means for transferring the resistance of each spring to the corresponding set of friction shoes.

5. In a friction shock absorbing mechanism, the combination with a friction shell having interior longitudinally extending friction surfaces; of wedge-friction-shoes cooperable with the shell friction surfaces; wedge elements cooperable with said shoes; a coil spring within the shell located between said shoes and compressible in a direction lengthwise of the shell, the length of said spring being substantially co-extensive with the length of the shoes; and means for transferring the resistance of said spring to the shoes.

6. In a friction shock absorbing mechanism, the combination with a friction shell having interior longitudinally extending friction surfaces; of a plurality of wedge-friction-shoes arranged in tandem formation within the shell and cooperable with the shell friction surfaces; wedging means cooperable with said shoes; tandem arranged springs within the shell and between the shoes, said springs being compressible in a direction lengthwise of the shell and each spring being of a length substantially co-extensive with the length of a friction-shoe; and means for transferring the resistance of said springs to the respective sets of shoes.

7. In a friction shock absorbing mechanism the combination with a friction shell having interior longitudinally extending friction surfaces; of tandem arranged friction-shoes within said shell cooperable with the surfaces thereof, said shoes being disposed on opposite sides of the center of the shell; a single wedge element cooperable with each tandem arranged set of shoes on one side of the shell; spring means disposed within the shell and located between the shoes; and means for transferring the resistance of said spring means to the shoes.

8. In a friction shock absorbing mechanism, the combination with a friction shell having interior longitudinally extending friction surfaces; of a pair of oppositely disposed friction shoes on the interior of the shell and cooperable with the friction surfaces thereof; a pair of wedge elements, one on the inner side of each friction-shoe; means interposed between said wedge elements arranged to prevent relative approach thereof transversely of the shell; a spring resistance within the shell located between said wedge elements; and means for transferring the resistance of the spring resistance to said shoes.

9. In a friction shock absorbing mechanism, the combination with a friction shell having interior longitudinally extending friction surfaces; of a pair of oppositely disposed wedge-friction-shoes on the interior of the shell cooperable with the friction surfaces of the latter; wedge elements cooperable with the shoes; a longitudinally arranged spring within the shell located between the shoes; a combined follower-cage associated with said spring; and transversely extending keys between said follower cage and the shoes, said keys having shouldered engagement with the follower cage and the shoes.

10. In a friction shock absorbing mechanism, the combination with a friction shell having interior longitudinally extending friction surfaces; of a pair of friction-shoes on each side of the shell arranged in tandem formation; wedge elements cooperable with said shoes; tandem arranged springs within the shell; a combined follower cage associated with each spring; and transversely extending keys between each spring cage and corresponding set of friction-shoes, said keys having shouldered engagement with the cages and the shoes.

11. In a friction shock absorbing mechanism the combination with a friction shell having longitudinally extending friction surfaces on the inner faces of the side walls thereof; of a pair of tandem arranged wedge-friction-shoes cooperable with the friction surface of each side of the shell; wedge elements cooperable with said shoes and disposed on the inner sides thereof; tandem arranged springs between the wedge elements; an intermediate fixed abutment for the inner end of the outer spring; and means for transferring the resistance of said springs to the respective sets of friction shoes.

12. In a friction shock absorbing mechanism the combination with a friction shell having side walls the inner faces of which are provided with longitudinally extending friction surfaces; of a pair of tandem arranged wedge-friction-shoes cooperable with each of said shell friction surfaces; side wedge elements located inwardly of the shoes; antifriction rollers between said elements and the shoes; a fixed abutment intermediate the ends of said shell; tandem arranged springs, one of said springs abutting the rear end of the shell and the other spring bearing on said abutment; a combined follower spring cage associated with the forward end of each spring; and transversely extending keys between said cages and the corresponding sets of friction-shoes, said keys having shouldered engagement with the cages and the shoes.

13. In a friction shock absorbing mechanism, the combination with a friction shell having interior friction surfaces; of oppositely disposed wedge-friction-shoes cooperable with said surfaces; longitudinally extending wedge elements cooperable with said wedge-friction-shoes; and a spring arranged longitudinally within the shell, the spring, shoes and wedge elements being so related that a transverse plane would intersect all of them.

In witness that I claim the foregoing I have hereunto subscribed my name this 13th day of Oct., 1921.

JOHN F. O'CONNOR.

Witnesses:
 CARRIE GAILING,
 ANN BAKER.